United States Patent Office 3,776,942
Patented Dec. 4, 1973

3,776,942
SUBSTITUTED 1 - (2 - HYDROXYBENZYLIDENE)-
4 - ALKOXYCARBONYLTHIOSEMICARBAZIDES
AND RELATED COMPOUNDS
George A. Miller, Glenside, and Stanley A. Greenfield,
Ambler, Pa., assignors to Rohm and Haas Company,
Philadelphia, Pa.
No Drawing. Filed Feb. 4, 1972, Ser. No. 223,720
Int. Cl. C07c 159/00
U.S. Cl. 260—470                    7 Claims

ABSTRACT OF THE DISCLOSURE

Novel compounds belonging to the class of halo-, nitro- or hydroxy-salicylaldehyde thiosemicarbazones having a 4-N-substituted alkoxy(aryl)-carbonyl, thioalkoxy(aryl)-carbonyl, alkyl(aryl)-carbonyl, thiocarbamoyl, carbamoyl, or phosphoryl group. They have utility as fungicides.

This invention is concerned with novel compounds of the structure

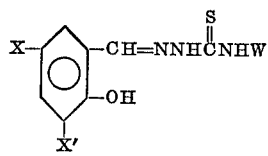

wherein

X is one of halo, preferably bromo and chloro, methoxy and nitro then X' is one of hydrogen, nitro and halo, preferably bromo and chloro, and;

alternatively, wherein X is hydrogen, then X' is one of methoxy and nitro;

W is the group (a) —C(Y)Z wherein Y is oxygen or sulfur and Z is one of the group $R_1$, $OR_1$, $SR_1$ wherein $R_1$ is alkyl, branched or straight chain, of 1–12 carbon atoms; chloro-substituted alkyl of 1–4 carbon atoms; benzyl substituted with bromo, chloro, methoxy or nitro; phenyl and phenyl substituted with bromo, chloro, methoxy and nitro; and the group —$NR_2R_3$ wherein $R_2$ and $R_3$ are the same or different alkyl, branched or straight chain, of 1–4 carbon atoms, (b) —$P(O)(OR_2)(OR_3)$ wherein $R_2$ and $R_3$ are the same or different alkyl, branched or straight chain, of 1–4 carbon atoms, and (c) alkyl of 1–12 carbon atoms when X and X' are other than hydrogen.

Typical compounds included in this general formula are:

1-(2-hydroxy-5-bromobenzylidene)-4-(methoxycarbonyl)-thiosemicarbazide
1-(2-hydroxy-5-chlorobenzylidene)-4-(ethoxycarbonyl) thiosemicarbazide
1-(2-hydroxy-5-iodobenzylidene)-4-benzoylthiosemicarbazide
1-(2-hydroxy-3-nitrobenzylidene)-4-(butoxycarbonyl) thiosemicarbazide
1-(2-hydroxy-3-methoxybenzylidene)-4-(thiomethoxycarbonyl) thiosemicarbazide
1-(2-hydroxy-5-methoxybenzylidene)-4-(thioethoxycarbonyl) thiosemicarbazide
1-(2-hydroxy-3,5-dibromobenzylidene-4-(ethoxythiocarbonyl) thiosemicarbazide
1-(2-hydroxy-3,5-dichlorobenzylidene)-4-(thioethoxythiocarbonyl) thiosemicarbazide
1-(2-hydroxy-3,5-difluorobenzylidene)-4-octyloxycarbonyl) thiosemicarbazide
1-(2-hydroxy-3,5-diiodobenzylidene)-4-(benzyloxycarbonyl) thiosemicarbazide
1-(2-hydroxy-3-bromo-5-chlorobenzylidene)-4-(4-chlorobenzyloxy-carbonyl)-thiosemicarbazide
1-(2-hydroxy-3-chloro-5-bromobenzylidene)-4-(4-nitrobenzyloxy-carbonyl)-thiosemicarbazide
1-(2-hydroxy-3-chloro-5-fluorobenzylidene)-4-phenacyl-thiosemicarbazide
1-(2-hydroxy-3-bromo-5-iodobenzylidene)-4-(dimethyl-thiocarbamyl) thiosemicarbazide
1-(2-hydroxy-3-nitro-5-bromobenzylidene)-4-(dimethyl-carbamyl) thiosemicarbazide
1-(2-hydroxy-3-nitro-5-chlorobenzylidene)-4-(diethyl-carbamyl) thiosemicarbazide
1-(2-hydroxy-3-nitro-5-iodobenzylidene)-4-(dibutyl carbamyl) thiocarbazide
1-(2-hydroxy-5-bromobenzylidene)-4-(diethylphosphono) thiosemicarbazide
1-(2-hydroxy-3-bromo-5-nitrobenzylidene)-4-(dimethylphosphono) thiosemicarbazide
1-(2-hydroxy-3,5-dichlorobenzylidene)-4-(2-chloroethyl)-carbonyl)-thiosemicarbazide
1-(2-hydroxy-5-bromobenzylidene)-4-(3-bromopropyl-carbonyl) thiosemicarbazide
1-(2-hydroxy-3,5-dibromobenzylidene)-4-[ethyl(methyl) thiocarbamyl]-thiosemicarbazide These compounds are excellent fungicides for the control of plant diseases. They are particularly effective for the control of Botrytis blights.

Chemically these compounds may be considered as derivatives of salicylaldehyde. They are novel compounds.

These compounds may be prepared by the general reaction of a substituted salicylaldehyde with hydrazine to form the corresponding salicylaldehyde hydrazone, followed by reaction of this with the appropriate isothiocyanate. The following equations depict these reactions. The various symbols have the meanings given above.

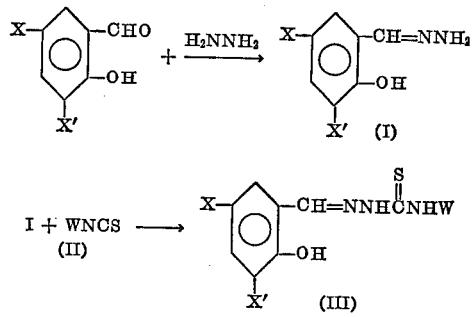

Another general type of reaction is that of a salicylaldehyde with a substituted thiosemicarbazone, thus

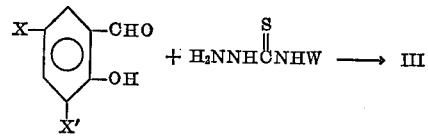

The salicylaldehyde intermediates are for the most part products of commerce or else are readily made by standard chemical reactions.

The reactions of the salicylaldehyde with hydrazine to produce the salicylaldehyde hydrazones of Formula I is a well-known general reaction and is usually carried out in the presence of an inert solvent under mild basic conditions. Inert solvents include water, alcohols, ethyl acetate, dioxane, dimethylformamide and dimethyl sulfoxide. Alcohols and aqueous alcohols are preferred solvents.

Basic conditions may be supplied by such typical basic compounds as potassium or sodium acetate, sodium carbonate, tertiary amines such as triethylamine or pyridine, and excess hydrazine.

The following illustrates a typical procedure using 3,5-dibromosalicylaldehyde hydrazone as an example.

To a solution of 86.6 g. (2.62 moles) of hydrazine in 500 ml. of methanol was added over a period of 2 hours, at room temperature a solution of 439 g. (1.57 mole) of 3,5-dibromosalicylaldehyde in 3 l. of methanol. A slurry resulted and was filtered. The solid residue was washed with methanol and dried to give 294 g. melting at 169–171° C. The filtrate was concentrated to give another 129 g. of solid melting at 165–167° C. The combined solids represent a 90% yield of 3,5-dibromosalicylaldehyde hydrazone.

The following Table I lists typical salicylaldehyde hydrazones which were made for use as intermediates in this investigation.

TABLE I.—SALICYLALDEHYDE HYDRAZONES

| Preparation | Compounds of Formula I | M.P. (° C.) |
|---|---|---|
| A | 3-methoxysalicylaldehyde hydrazone | 51–53 |
| B | 3-nitrosalicylaldehyde hydrazone | 181–183 |
| C | 5-bromosalicylaldehyde hydrazone | 68–70 |
| D | 5-chlorosalicylaldehyde hydrazone | 83–85 |
| E | 5-methoxysalicylaldehyde hydrazone | 111–113 |
| F | 5-nitrosalicylaldehyde hydrazone | 186–187 |
| G | 3,5-dibromosalicylaldehyde hydrazone | 169–171 |
| H | 3,5-dichlorosalicylaldehyde hydrazone | 149–150 |
| I | 3-bromo-5-nitrosalicylaldehyde hydrazone | 205–206 |
| J | 3-nitro-5-bromosalicylaldehyde hydrazone | 217–219 |

The intermediate acyl isothiocyanates, i.e. compounds of Formula II, used to react with the hydrazones of Formula I are well known in the chemical art. One description may be found in Quarterly Reports on Sulfur Chemistry 5, 169–175 (1970) in an article by J. Goerdeler. In general, these acyl isothiocyanates are readily made by reaction under anhydrous conditions of an acyl halide with a thiocyanate salt at about room temperature in a solvent with gives a homogeneous medium. Ordinarily the acyl isothiocyanates so produced are isolated by low temperature concentration of the reaction filtrate and used without further purification in order to avoid excessive decomposition. The isothiocyanates are readily identified by the infrared spectrum.

As an illustration of a typical preparation, the following describes the method used for making ethoxycarbonyl isothiocyanate. Dry potassium thiocyanate (89 g., 0.9 mole) was dissolved in 800 ml. of dried acetonitrile by slight warming. Ethyl chloroformate (81 g., 0.75 mole) was then added dropwise over 15 minutes. The reaction mixture was stirred at room temperature for 2 hours. It was then diluted with ether and filtered to remove potassium chloride. The filtrate was stripped of solvent under vacuum using as little heat as possible to give 46 g. of a yellow-red oil. Infrared analysis confirmed that this was a 47% yield of technical ethoxycarbonyl isothiocyanate.

The dialkyl phosphoroisothiocyanatidates, $(R_4O)(R_5O)P(O)NCS$, are known in the literature, e.g., see Canadian J. Chem. 37, 527 (1959). The preparation of diethyl phosphoroisothiocyanatidate, described below, is typical. To a mixture of dry ammonium thiocyanate (7.6 g., 0.1 mole) in 20 ml. of dry benzene was added dropwise at 15–20° C., diethyl phosphorochloridate (15 g., 0.087 mole). An additional 30 ml. of dry benzene was then added and the reaction mixture stirred 5 hours. Cold, dilute salt solution was then added and the benzene layer was washed with additional cold, dilute salt solution until the washings were no longer acidic. The benzene solution was dried and then stripped of solvent to give 15 g. of yellow oil which is an 82% yield of diethyl phosphoroisothiocyanatidate identified by infrared.

The reaction of the salicylaldehyde hydrazones of Formula I with the isothiocyanates of Formula II is an adaption of the general procedure of Pulvermacher as explained in Chem. Ber. 27, 613 (1894). For this, the hydrazone in an inert solvent is added to up to 50% excess of the isothiocyanate in the same solvent in the temperature range of 15–45° C. and stirred for up to 24 hours. The residue left after removal of the solvent is the desired thiosemicarbazone of Formula III, and this is usually further purified as by recrystallization.

Inert solvents include acetonitrile, bis-ethers of glycols such as 1,2-dimethoxyethane (glyme), dioxane, and dimethylformamide. Of these the glycol ethers are preferred.

The temperature chosen is in part dependent on the stability of the reactants. For the most part room temperature is preferred. One side reaction to be avoided is disproportionation of the hydrazone leading to the corresponding azine $(X,X'—2—HOC_6H_2C=N—)_2$. The stability of a hydrazone or an isothiocyanate varies according to the specific compound.

The preparation of 1-(2-hydroxy-3,5-dibromobenzylidene)-4-(ethoxycarbonyl)thiosemicarbazide is typical. To a solution of 3,5-dibromosalicylaldehyde (162 g., 0.578 mole) in 1 l. of glyme was added dropwise a solution of ethoxycarbonyl isothiocyanate (96 g., 0.731 mole) in 100 ml. of glyme over a period of 2.5 hrs. The reaction mixture was then stirred 18 hrs. The solvent was then removed under reduced pressure leaving a solid residue. The solid was washed with 1 l. of hot methanol and filtered hot to give 160 g. of solid melting at 218–200° C. This was a 67% yield of 1-(2-hydroxy-3,5-dibromobenzylidene)-4-(ethoxycarbonyl)thiosemicarbazide.

In the prior art there are several thiosemicarbazones analogous to those of Formula III but without a 4-substituent i.e.,

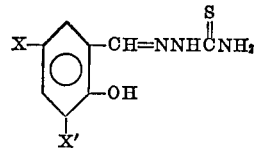

These compounds have been evaluated for activity against human pathogenic fungi and bacteria, but nothing is known concerning their effect on the control of plant diseases.

U.S. Pat. 3,182,082 gives details on the germicidal activity of 5-Cl, 3,5-dibromo and 3,5-dichlorosalicylaldehyde thiosemicarbazones, having 4-phenyl substituents. Bhat et al. in Indian J. Chem. 5, 616 (1967) reported antifungal activity on human pathogenic fungi for 5-chlorosalicylaldehyde thiosemicarbazones having 4-alkyl and 4-phenyl substituents. Bhamaria et al. in Indian Jr. Exp. Biol. 6, 62 (1968) described antitubercular and antibacterial activity for the same compounds.

The following Table II gives typical examples of the compounds of this invention and Table III gives the analytical data for these examples:

TABLE II

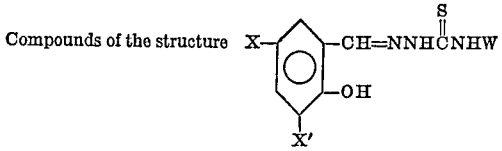

Compounds of the structure

| Example | X | X' | W | Melting point (° C.) |
|---|---|---|---|---|
| 1 | Br | Br | $C_4H_9$ | 196–197 |
| 2 | Cl | Cl | $CH_3$ | 202–203 |
| 3 | Cl | Cl | $C_4H_9$ | 162–163 |
| 4 | Cl | Cl | $C_8H_{17}$ | 169–170 |
| 5 | Br | Br | $—C(O)CH_3$ | 215–216 |
| 6 | Br | Br | $—C(O)C_6H_5$ | 224–225 |
| 7 | Br | Br | $—C(O)C_6H_3Cl_2—3,4$ | 235–237 |
| 8 | Br | Br | $—COOCH_3$ | 222–223 |

TABLE II—Continued

| Example | X | X' | W | Melting point (°C.) |
|---|---|---|---|---|
| 9 | Cl | Cl | —COOCH$_3$ | 210–211 |
| 10 | Br | H | —COOC$_2$H$_5$ | 248–250 |
| 11 | Br | Br | —COOC$_2$H$_5$ | 209–211 |
| 12 | Cl | Cl | —COOC$_2$H$_5$ | 194–195 |
| 13 | H | CH$_3$O | —COOC$_2$H$_5$ | 166–168 |
| 14 | CH$_3$O | H | —COOC$_2$H$_5$ | 169–171 |
| 15 | H | NO$_2$ | —COOC$_2$H$_5$ | 166–168 |
| 16 | NO$_2$ | H | —COOC$_2$H$_5$ | 202–204 |
| 17 | NO$_2$ | Br | —COOC$_2$H$_5$ | >250 |
| 18 | Br | NO$_2$ | —COOC$_2$H$_5$ | 243–245 |
| 19 | Br | Br | —C(O)SC$_2$H$_5$ | 189–191 |
| 20 | Br | Br | —COOCH$_2$CH$_2$Cl | 204–205 |
| 21 | Br | Br | —COOCH$_2$CCl$_3$ | 238–240 |
| 22 | Br | Br | —COOC$_4$H$_9$ | 188–190 |
| 23 | Cl | Cl | —COOC$_4$H$_9$ | 174–176 |
| 24 | Br | Br | —COOC$_8$H$_{17}$ | 144–146 |
| 25 | Br | Br | —COOCH$_2$C$_6$H$_5$ | 215–217 |
| 26 | Br | Br | —COOCH$_2$C$_6$H$_4$NO$_2$—4 | 208–210 |
| 27 | Br | Br | —COOC$_6$H$_4$OCH$_3$—4 | 258–260 |
| 28 | Br | Br | —C(O)N(CH$_3$)$_2$ | 217–218 |
| 29 | Br | Br | —C(S)N(CH$_3$)$_2$ | 225–227 |
| 30 | Br | Br | —P(O)(OC$_2$H$_5$)$_2$ | 241–243 | the compounds at 1200 p.p.m. and spraying the plants to run off in a carrier volume of about 100 gallons/a. Subsequent tests were then sometimes made using a concentration of 150 p.p.m. for bactericidal and fungicidal tests.

The general procedure for bactericidal and fungicidal tests was to take potted plants in proper condition of growth for susceptibility to the plant diseases to be evaluated, to spray these on a moving belt and allow to dry. The proper plants were then inoculated with the respective bacterial cells or fungal spores and then allowed to incubate until the disease had developed and the control read or estimated. The percent disease control was reported by the following rating system:

A = 90–100% control
B = 80–90% control
C = 70–80% control
D = 50–70% control
E = Inactive, <50% control

TABLE III.—ANALYTICAL DATA ON EXAMPLES

| Example | Empirical formula | Percent | | | | | |
|---|---|---|---|---|---|---|---|
| | | C | H | Halogen | N(P) | O | S |
| 1 | C$_{12}$H$_{15}$Br$_2$N$_3$OS | 35.5 (35.2) | 3.7 (3.7) | Br, 39.2 (39.2) | 10.2 (10.2) | 4.2 (3.9) | 7.8 (7.8) |
| 2 | C$_9$H$_9$Cl$_2$N$_3$OS | 38.9 (38.8) | 3.1 (3.2) | Cl, 25.9 (25.5) | 14.7 (15.1) | 6.2 (5.8) | 11.5 (11.5) |
| 3 | C$_{12}$H$_{15}$Cl$_2$N$_3$OS | 44.9 (45.0) | 5.1 (4.7) | Cl, 21.1 (21.1) | 13.7 (13.1) | 4.7 (5.0) | 11.2 (10.0) |
| 4 | C$_{16}$H$_{23}$Cl$_2$N$_3$OS | 51.1 (51.1) | 6.1 (6.1) | Cl, 19.0 (18.9) | 11.1 (11.1) | 6.2 (4.3) | 8.9 (8.5) |
| 5 | C$_{10}$H$_9$Br$_2$N$_3$O$_2$S | 30.8 (30.4) | 2.4 (2.3) | Br, 40.5 (40.5) | 10.4 (10.6) | 8.4 (8.1) | 8.3 (8.1) |
| 6 | C$_{15}$H$_{11}$Br$_2$N$_3$O$_2$S | 39.7 (39.4) | 2.6 (2.4) | Br, 35.0 (34.9) | 9.1 (9.2) | 7.1 (7.0) | 7.1 (7.0) |
| 7 | C$_{16}$H$_9$Br$_2$Cl$_2$N$_3$O$_2$S | 34.0 (34.3) | 1.7 (1.5) | Br, 35.5 (30.5) Cl, 13.0 (13.5) | 7.9 (8.0) | 6.0 (6.1) | 6.2 (6.1) |
| 8 | C$_{10}$H$_9$Br$_2$N$_3$O$_3$S | 29.2 (29.2) | 2.2 (2.2) | Br, 38.6 (38.9) | 10.0 (10.2) | 11.9 (11.7) | 8.0 (7.8) |
| 9 | C$_{10}$H$_9$Cl$_2$N$_3$O$_3$S | 37.8 (37.2) | 3.0 (3.0) | Cl, 21.5 (22.0) | 13.0 (13.9) | 14.7 (14.9) | 9.7 (9.9) |
| 10 | C$_{11}$H$_{12}$BrN$_3$O$_3$S | 38.4 (38.2) | 3.7 (3.5) | Br, 23.2 (23.2) | 11.9 (12.1) | 13.9 (13.9) | 9.0 (9.2) |
| 11 | C$_{11}$H$_{11}$Br$_2$N$_3$O$_3$S | 31.0 (31.1) | 2.5 (2.6) | Br, 39.1 (37.6) | 9.4 (9.9) | 11.1 (11.3) | 6.5 (7.5) |
| 12 | C$_{11}$H$_{11}$Cl$_2$N$_3$O$_3$S | 39.2 (39.3) | 3.5 (3.3) | Cl, 21.1 (21.1) | 12.2 (12.5) | 14.4 (14.3) | 9.5 (9.5) |
| 13 | C$_{12}$H$_{15}$N$_3$O$_4$S | 49.2 (48.5) | 4.9 (5.0) | | 13.8 (14.2) | 22.0 (21.5) | 10.4 (10.8) |
| 14 | C$_{12}$H$_{15}$N$_3$O$_4$S | 48.6 (48.5) | 5.2 (5.0) | | 14.0 (14.2) | 21.8 (21.5) | 10.5 (10.8) |
| 15 | C$_{11}$H$_{12}$N$_4$O$_5$S | 42.6 (42.3) | 4.2 (3.9) | | 18.0 (17.9) | 25.5 (25.6) | 10.3 (10.3) |
| 16 | C$_{11}$H$_{12}$N$_4$O$_5$S | 42.5 (42.3) | 3.9 (3.9) | | 17.6 (17.9) | 25.5 (25.6) | 10.3 (10.3) |
| 17 | C$_{11}$H$_{11}$BrN$_4$O$_5$S | 34.5 (33.8) | 3.1 (2.8) | Br, 22.9 (20.4) | 14.3 (14.3) | 19.8 (20.4) | 6.8 (8.2) |
| 18 | C$_{11}$H$_{11}$BrN$_4$O$_5$S | 34.2 (33.8) | 2.8 (2.8) | Br, 21.6 (20.4) | 13.7 (14.3) | 20.7 (20.4) | 6.8 (8.2) |
| 19 | C$_{11}$H$_{11}$Br$_2$N$_3$O$_2$S$_2$ | 30.8 (30.0) | 2.5 (2.5) | Br, 37.0 (36.2) | 9.0 (9.5) | 7.8 (7.2) | 13.5 (14.5) |
| 20 | C$_{11}$H$_{10}$Br$_2$ClN$_3$O$_3$S | 28.9 (28.7) | 2.4 (2.2) | Br, 34.7 (34.8) Cl, 7.8 (7.8) | 9.2 (9.2) | 10.4 (10.4) | 7.1 (6.9) |
| 21 | C$_{11}$H$_8$Br$_2$Cl$_3$N$_3$O$_3$S | 25.4 (25.0) | 1.5 (1.5) | Br, 29.7 (30.3) Cl, 19.1 (20.2) | 8.0 (8.0) | 9.0 (9.1) | 6.1 (6.0) |
| 22 | C$_{13}$H$_{15}$Br$_2$N$_3$O$_3$S | 34.8 (34.4) | 3.5 (3.3) | Br, 35.1 (35.3) | 9.2 (9.3) | 10.9 (10.6) | 7.1 (7.1) |
| 23 | C$_{13}$H$_{15}$Cl$_2$N$_3$O$_3$S | 42.9 (42.7) | 4.3 (4.1) | Cl, 19.5 (19.5) | 11.8 (11.6) | 13.4 (13.2) | 9.1 (8.8) |
| 24 | C$_{17}$H$_{23}$Br$_2$N$_3$O$_3$S | 40.5 (40.1) | 4.5 (4.6) | Br, 31.6 (31.4) | 8.1 (8.2) | 9.4 (9.4) | 6.3 (6.3) |
| 25 | C$_{16}$H$_{13}$Br$_2$N$_3$O$_3$S | 39.8 (39.4) | 2.6 (2.7) | Br, 32.0 (32.8) | 8.4 (8.6) | 9.8 (9.8) | 6.5 (6.6) |
| 26 | C$_{16}$H$_{12}$Br$_2$N$_4$O$_5$S | 36.1 (36.1) | 2.3 (2.3) | Br, 29.4 (30.0) | 10.3 (10.5) | 15.1 (15.0) | 6.1 (6.0) |
| 27 | C$_{16}$H$_{13}$Br$_2$N$_3$O$_4$S | 38.1 (38.2) | 2.6 (2.6) | Br, 31.4 (31.8) | 8.2 (8.3) | 12.7 (12.7) | 6.4 (6.4) |
| 28 | C$_{11}$H$_{12}$Br$_2$N$_4$O$_2$S | 31.0 (31.2) | 2.8 (2.8) | Br, 37.6 (37.5) | 13.1 (13.2) | 7.8 (7.5) | 7.4 (7.5) |
| 29 | C$_{11}$H$_{12}$Br$_2$N$_4$OS$_2$ | 30.2 (30.0) | 2.7 (2.7) | Br, 36.5 (36.4) | 12.1 (12.7) | 4.0 (3.6) | 14.6 (14.5) |
| 30 | C$_{12}$H$_{16}$Br$_2$N$_3$O$_4$PS | 29.8 (29.5) | 3.4 (3.3) | Br, 32.7 (32.7) | N, 8.1 (8.6) P, 6.2 (6.3) | 6.3 (6.5) | |

The compounds of this invention have utility as agricultural bactericides, fungicides and viricides for combatting plant diseases.

In evaluating these compounds for these purposes a preliminary microbicidal evaluation was carried out using The viricide tests differ from the above in that the test plants were inoculated before the chemical was applied, otherwise the general procedure was the same.

The plants and diseases used in this investigation are given in Table IV.

TABLE IV.—PLANT DISEASES EVALUATED

| Disease | Plant (age) | Incubation period and temperature |
|---|---|---|
| A. Fungal (inoculum/ml.): | | |
| (1) Botrytis blight, *Botrytis cinerea* (150,000 spores) | Faba bean (10 days), *Vicia faba* | 3 days (80–82° F.). |
| (2) Bean powdery mildew, *Erysiphe polygoni* (10–25,000 spores) | Dwarf bean (2 wks.), *Phaseolus vulgaris* | 10 days (ambient). |
| (3) Rice blast, *Piricularia oryzae* (10–25,000 spores) | Rice (2 wks.), *Oryza sativa* | 1 day[1] plus 5–8 days (80–82° F.). |
| (4) Tomato late blight, *Phytophthora infestans* | Tomato (3 wks.), *Lycopersicum esculentum*. | 1.5 days (55° F.), 1–2 days (70° F.). |
| (5) Cucumber downy mildew, *Pseudoperonospora cubensis* (10,000 spores). | Cucumber (2 wks.), *Cucumis sativa* | 1 day (70° F.),[1] 6 days (ambient). |
| (6) Cercospora blight, *Cercospora apii* (25,000 spores) | Celery, *Apium graveolens* | 1 day (80° F.),[1] 14–18 days (ambient). |
| (7) Barley helminthosporium, *Helminthosporium teres* (10–15,000 spores). | Barley *Hordeum vulgare* | (1 wk.) 1 day (80° F.),[1] 3–4 days (75° F.). |
| B. Bacterial (inoculum/ml.): | | |
| (1) Soybean common blight, *Pseudomonas glycinea* (9–12 × 10$^5$ cells). | Soybean (1–2 wks.), *Soja max* | 6 days (ambient). |
| (2) Cotton blight, *Xianthomonas malvacearum* (aqueous extract) | Cotton (2 wks.), *Gossypium hirsutum* | 7–9 days (ambient). |
| C. Viral (inoculum): | | |
| (1) Cucumber mosaic, CMV (30 ml. of sap/350 plants) | Cucumber (1–2 wks.) | 1–4 days before application of chemical, then 7–9 days after (ambient). |
| (2) Tobacco mosaic, TMV (40 ml. of sap/350 plants) | Tomato (3 wks.) | 1 day before application of chemical, then 8–10 days after (ambient). |

[1] High humidity.

The results of these tests are given in Table V.

TABLE V.—DISEASE CONTROL INDEX AT 1,200 P.P.M.

| Example | B. cinerea | E. polygoni | P. oryzae | P. infestans | P. cubensis | C. apii | H. teres | P. glycinea | X. malvacearum | CMV | TMV |
|---|---|---|---|---|---|---|---|---|---|---|---|
| 1 | | | | | | | | | | | |
| 2 | E | | A | E | A | B | E | E | E | E | E |
| 3 | E | E a | E | A | A | E | | E | | | |
| 4 | E | B a | A | E | A | E | | E | | | |
| 5 | E | E a | C | E | E | E | | E | | | |
| 6 | B | A | A | E | E | A | E | E | E | E | E |
| 7 | E | B | B | E | E | E | E | E | E | A | E |
| 8 | C | | E | E | E | E | E | E | E | E | E |
| 9 | E | B | E | E | A | E | E | E | E | E | E |
| 1 | A | B | E | E | E | A | B | E | E | E | E |
| 10 | | | E | E | E | B | E | | A | E | E |
| 11 | A | A | | A | E | A | E | E | | E | E |
| 12 | C | E | A | D | E | E | | E | | | |
| 13 | | | B b | | E b | | E b | | E b | E b | E b |
| 14 | | | E b | E b | E b | B b | E b | | B b | E b | E b |
| 15 | | | E b | E b | E b | B b | E b | | B b | E b | E b |
| 16 | | | E b | | E b | B b | E b | | E b | E b | E b |
| 17 | | | E b | | E b | | E b | | E b | E b | E b |
| 18 | | | B b | | A b | | E b | | E b | E b | E b |
| 19 | B | B | B | E | E | A | E | E | E | E | E |
| 20 | C | | C | E | E | | E | E | E | E | E |
| 21 | E | | A | B | | E | E | E | E | E | E |
| 22 | E | B | E | E | A | D | E | E | E | E | E |
| 23 | A | A | A | | E | B | E | E | E | E | E |
| 24 | E | | E | E | E | E | E | E | E | E | E |
| 25 | C | | E | E | E | C | E | E | E | E | E |
| 26 | E | | E | E | E | E | E | E | E | E | E |
| 27 | B | B | A | E | E | B | E | E | E | E | E |
| 28 | E | E | B | B | E | E | E | E | E | E | E |
| 29 | E | A | E | E | E | E | E | E | E | A | E |
| 30 | B | B | A | B | E | A | E | E | E | E | E | a At 150 p.p.m.   b 300 p.p.m.

Certain of these compounds give excellent control of *Botrytis cinerea* on grapes. They have an advantage over the commercial fungicides now used for botrytis control in that they do not delay the fermentation of grape juice in its conversion to wine. The following type test was devised to determine this.

A standard grape juice mixture was prepared by combining 400 ml. of commercial grape juice, 45 g. of sucrose and 50 million *Saccharomyces cerevisiae* yeast cells. The test chemical was then added at a given concentration in parts per million (p.p.m.) and the flasks were stoppered with an outlet provided, which connected to a 120 ml. bottle filled with water. As fermentation progressed, carbon dioxide was produced and was trapped in the bottle. The time required to collect approximately 120 ml. of carbon dioxide was determined. N-trichloromethylthiophthalimide (folpet) was used as a standard. Table VI gives the results.

TABLE VI

| Example | P.p.m. | Hours required to produce 120 ml. of $CO_2$ |
|---|---|---|
| 11 | 1 | 24 |
|  | 5 | 24 |
|  | 20 | 24 |
| Folpet | 1 | 24 |
|  | 5 | 96 |
|  | 20 | >200 |
| Untreated control | | 24 |

The thiosemicarbazones of this invention are useful as agricultural fungicides and as such may be applied to various loci such as the seed, the soil or the foliage. For such purposes these thiosemicarbazones may be used in the technical or pure form as prepared, as solutions or as formulations. The compounds are usually taken up in a carrier or are formulated so as to render them suitable for subsequent dissemination as pesticides. For example, these thiosemicarbazones may be formulated as wettable powders, emulsifiable concentrates, dusts, granular formulations, aerosols, or flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1970 Annual."

In general, the compounds of this invention are somewhat limited in solubility but they may be dissolved in certain solvents such as dimethylformamide, pyridine or dimethyl sulfoxide and such solutions extended with water. The concentration of the solution may vary from 2% to 50% with a preferred range being 5 to 25%.

For the preparation of emulsifiable concentrates, the compound may be dissolved in suitable organic solvents, or a mixture of solvents, together with an emulsifying agent which permits dispersion of the pesticide in water. The concentration of the active ingredient in emulsifiable concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%. A typical wettable powder was made by blending 50 parts of the compound of Example 11, 45 parts of a synthetic precipitated hydrated silicon dioxide sold under the trademark Hi-Sil®, and 5 parts of sodium lignosulfonate (Marasperse® N-22). In another preparation a kaolin type (Barden) clay was used in place of the Hi-Sil in the above wettable powder, and in another such preparation 25% of the Hi-Sil was replaced with a synthetic sodium silico aluminate sold under the trademark Zeolex® 7.

Dusts are prepared by mixing the thiosemicarbazones with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The thiosemicarbazones can be applied as fungicidal sprays by methods commonly employed, such as conventional high-gallonage hydraulic sprays, low gallonage sprays, airblast spray, aerial sprays and dusts. The dilution and rate of application will depend upon the type of equipment employed, the method of application and diseases to be controlled, but the effective amount is usually 0.1 lb. to 25 lbs. per acre of the active ingredient.

As a seed protectant, the amount of toxicant coated on the seed is usually at a dosage rate of about 0.1 to 20 ounces per hundred pounds of seed. As a soil fungicide, the chemical may be incorporated in the soil or applied to the surface usually at a rate of 0.1 to 25 lbs. per acre. As a foliar fungicide, the toxicant is usually applied to growing plants at a rate of 0.25 to 10 pounds per acre.

Fungicides which may be combined with the fungicides of this invention include:

(a) Dithiocarbamates and derivatives such as:

ferric dimethyldithiocarbamate (ferbam),
zinc dimethyldithiocarbamate (ziram),
manganese ethylenebisdithiocarbamate (maneb) and its coordination product with zinc ion (mancozeb),
zinc ethylenebisdithiocarbamate (zineb),
sodium methyldithiocarbamate (metham),
tetramethylthiuram disulfide (thiram), and
3,5-dimethyl-1,3,5-2H-tetrahydrothiadiazine-2-thione (dazomet);

(b) Nitrophenol derivatives such as:

dinitro-(1-methylheptyl)phenyl crotonate (dinocap), 2-sec-butyl-4,6-dinitrophenyl 3,3-dimethylacrylate (binapacryl), and
2-sec-butyl-4,6-dinitrophenyl isopropyl carbonate;

(c) Heterocyclic structures such as:

N-trichloromethylthiotetrahydro-phthalimide (captan),
N-trichloromethylthiophthalimide (folpet),
2-heptadecyl-2-imidazoline acetate (glyodin),
2-octylisothiazolone-3,
2,4-dichloro-6-(o-chloroanilino)-s-triazine,
diethyl phthalimidophosphorothioate,
4-butyl-1,2,4-triazole,
5-amino-1-[bis(dimethylamino)phosphinyl]-3-phenyl-1,2,4-triazole,
5-ethoxy-3-trichloromethyl-1,2-4-thiazdiazole,
2,3-dicyano-1,4-dithiaanthraquinone (dithianon),
2-thio-1,3-dithio-[4,5-b]quinoxaline (thioquinox),
methyl 1-(butylcarbamoyl)-2-benzimidazole carbamate (benomyl),
2-(4-thiazolyl)benzimidazole,
4-(2-chlorophenylhydazono)-3-methyl-5-isoxazolone,
pyridine-2-thiol-1-oxide,
8-hydroxyquinoline sulfate,
2,3-dihydro-5-carboxanilino-6-methyl-1,4-oxathiin-4,4-dioxide,
2,3-dihydro-5-carboxanilido-6-methyl-1,4-oxathiin,
α-(phenyl)-α-(2,4-dichlorophenyl)-5-pyrimidinylmethanol (triarimol),
cis-N-[1,1,2,2-tetrachloroethyl)thio]-4-cyclohexene-1,2-dicarboximide,
3-[2-(3,5-dimethyl-2-oxycyclohexyl-2-hydroxy]glutarimide (cycloheximide), and
dehydroacetic acid;

(d) Miscellaneous halogenated fungicides such as:

tetrachloro-p-benzoquinone (chloranil),
2,3-dichloro-1,4-benzothoquinone (dichlone),
1,4-dichloro-2,5-dimethoxybenzene (chloroneb),
3,5,6-trichloro-o-anisic acid (tricamba),
2,4,5,6-tetrachloroisophthalonitrile,
2,6-dichloro-4-nitroaniline (DCNA),
2-chloro-1-nitropropane,
polychloronitrobenzenes such as:
pentachloronitrobenzene (PCNB) and
tetrafluorodichloroacetone;

(e) Fungicidal antibiotics such as:

griseofuloin,
kasugamycin and
streptomycin;

(f) Copper-based fungicides such as:

cuprous oxide,
basic cupric chloride,
basic copper carbonate,
copper naphthenate, and
Bordeaux mixture; and (g) Miscellaneous fungicides such as:

diphenyl,
dodecylguanidine acetate (dodine),
phenylmercuric acetate,
N-ethylmercuri-1,2,3,6-tetrahydro-3,6-endomethano-3,4,5,6,7,7-hexachlorophthalimide,
phenylmercuric monoethanolammonium lactate,
p-dimethylaminobenzenediazo sodium sulfonate,
methyl isothiocyanate,
1-phenylthiosemicarbazide,
nichel-containing compounds,
calcium cyanamide,
lime sulfur, and
sulfur.

We claim:

1. A compound of the formula:

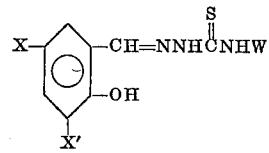

wherein
X is one of halo, methoxy and nitro
then X' is one of hydrogen, nitro and halo and;
alternatively, wherein X is hydrogen, then X' is one of methoxy and nitro;
W is COOR, wherein $R_1$ is
(1) alkyl, branched or straight chain, of 1–12 carbon atoms,
(2) chloro-substituted alkyl of 1–4 carbon atoms,
(3) benzyl,
(4) benzyl substituted with bromo, chloro, methoxy or nitro,
(5) phenyl, and
(6) phenyl substituted wtih bromo, chloro, methoxy or nitro.

2. A compound according to claim 1 wherein X and X' are chloro.

3. A compound according to claim 1 wherein X and X' are bromo.

4. A compound according to claim 2 wherein W is a ($C_1$–$C_{12}$ alkoxy)carbonyl group.

5. A compound according to claim 3 wherein W is a ($C_1$–$C_{12}$ alkoxy)carbonyl group.

6. A compound according to claim 2 wherein W is a methoxycarbonyl group.

7. A compound according to claim 3 wherein W is an ethoxycarbonyl group.

References Cited

UNITED STATES PATENTS

| | | | |
|---|---|---|---|
| 2,668,178 | 2/1954 | Behnisch et al. | 260—470 |
| 2,676,978 | 4/1954 | Schmidt | 260—470 |
| 2,741,635 | 4/1956 | Hoffman et al. | 260—470 |
| 3,182,082 | 5/1965 | Sydor | 260—552 |

OTHER REFERENCES

Bhamaria et al.: C.A. 68 93725g (1968).
Bhat et al.: C.A. 69 26933f (1968).
Bhat et al.: C.A. 68 59501w.
Watanabe et al.: C.A. 60 8032h.

LORRAINE A. WEINBERGER, Primary Examiner

J. F. TERAPANE, Assistant Examiner

U.S. Cl. X.R.

260—455 A, 552 SC, 566 B, 938; 424—215, 300, 323